Aug. 8, 1939.  F. NICKOLA  2,168,533
VEHICLE WINDSHIELD
Filed Jan. 15, 1938
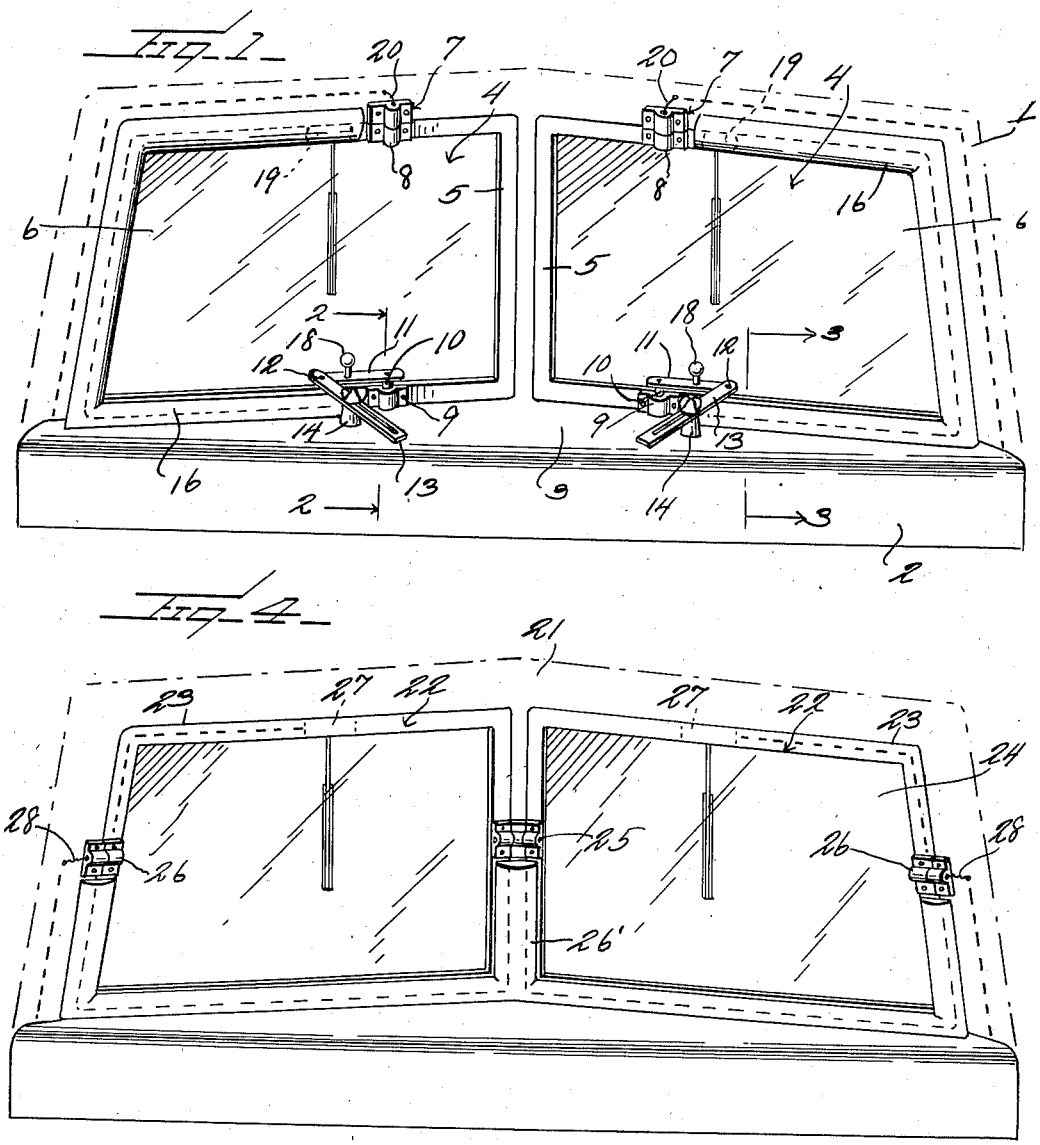
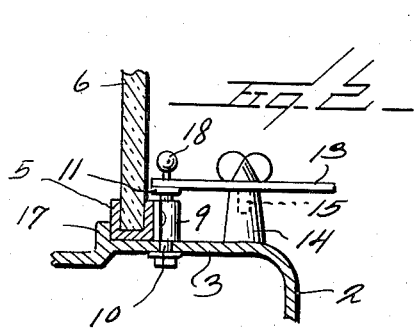
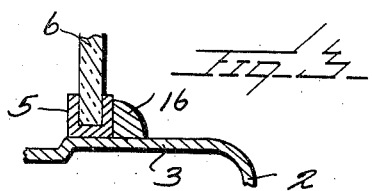
Inventor
Faris Nickola
By Watson E. Coleman
Attorney Patented Aug. 8, 1939

2,168,533

UNITED STATES PATENT OFFICE 2,168,533

VEHICLE WINDSHIELD

Faris Nickola, Flint, Mich.

Application January 15, 1938, Serial No. 185,236

1 Claim. (Cl. 296—84)

This invention relates to improvements in windshields for motor vehicles and pertains particularly to an improved windshield for use upon closed vehicles, such as coupes or sedans or in closed cabs of trucks.

The present invention has for its primary object to provide an improved windshield structure which is so constructed that adjustments may be made which will facilitate ventilation of the vehicle through the front part or windshield portion thereof.

Another object of the invention is to provide an improved motor vehicle windshield structure which is constructed in a novel manner to facilitate the driver or an occupant of the vehicle wiping the windshield where necessary without having to get out of the vehicle.

Still another object of the invention is to provide an improved windshield construction which may be adjusted in a manner to control the steaming of the windshield so that this undesirable condition need not be contended with by the vehicle driver, as is frequently the case when driving a closed vehicle in cold weather.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claim.

In the drawing—

Figure 1 is a view in elevation of the interior of a motor vehicle windshield constructed in accordance with the present invention, the parts of the shield being mounted for oscillation on vertical axes.

Figure 2 is a section taken on the line 2—2 of Figure 1.

Figure 3 is a section taken on the line 3—3 of Figure 1.

Figure 4 is an interior elevational view of a modified form of the invention.

Referring now more particularly to the drawing, the numeral 1, in Figure 1, generally designates the front interior portion of the part of a vehicle body surrounding the windshield, while the numeral 2 generally designates the instrument panel, the top part of which extends upwardly and forwardly forming the relatively wide portion 3.

The windshield embodying the present invention is indicated as a whole by the numeral 4 and comprises the two frame portions 5, each of which has the usual transparent panel 6 therein.

In accordance with the present invention, each of the windshield frames or sections 5 has at its top edge a hinge unit 7 which is here shown as consisting of the two hinge sections 8, one of which is attached to the frame, while the other is attached to the adjacent body portion, as illustrated. Directly beneath each of the hinge units 7, each frame has a hinge ear 9 attached thereto which carries a pin 10 which passes through and is pivotally attached to the plate portion 3 of the instrument panel. The pins 10 of the lower hinge ears 9 are in vertical alinement with the pins of the hinge units 7 so that the frames 5 may oscillate on vertical axes and, as shown in Figure 1, the axes for the frames are nearer the meeting edges of the frames than the outer edges thereof.

Each of the pins 10 has secured thereto one end of an arm 11 which extends lengthwise of the adjacent frame toward the outer side thereof and is pivotally attached at 12 to one end of a link arm 13. The link arm 13 is slotted, as shown, and extends across the top of a post 14 which receives at its upper end the threaded shank portion of a wing screw 15 which passes through the slot of the link 13 and which, as will be readily understood, is employed to secure the link in adjusted position relative to the post 14 as the adjacent frame 5 is shifted to opened or closed position.

The frames or panels 5 of the structure as illustrated in Figure 1 are designed to swing inwardly at their meeting edges and, therefore, a weather stripping 16 is placed about the inner side of the window opening in position to cover a portion of that part of each frame 5 lying between the carrying hinges therefor and the outer edge and the outside of the window opening is provided with a similar weather stripping 17 which covers a portion of that part of each frame which lies between the supporting hinges and the inner side or edge thereof. Thus, it will be seen that the frames 5 and the glass panels carried thereby may be oscillated to swing the outer sides of the frames forwardly and shift the meeting sides of the frames inwardly. This operation is facilitated by the provision of a handle 18 upon each of the bars 11.

The usual windshield wiper mechanism may be mounted upon each frame 5, as indicated at 19, and in the form of the invention illustrated in Figure 1, the current supplying wires may be run thereto through the framework of the machine and through the hinge pins of the hinge units 7, as indicated at 20, and then carried back through the frame 5 to the wiper mechanism, as indicated in dotted lines.

Figure 4 illustrates a modified form of the invention wherein the portion of the vehicle body surrounding the windshield structure is indicated generally by the numeral 21 and each of the windshield sections or panels is generally designated by the numeral 22, each comprising the frame 23 and the transparent pane 24 within the frame.

In this modified form of the invention the panels 22 are mounted upon the inner and outer hinge units 25 and 26 respectively, these units being placed at the longitudinal centers of the panels so that the latter may swing on horizontal axes instead of vertical axes as in the form illustrated in Figure 1. In this construction where the panels swing horizontally, it is preferred that the lower sides thereof swing outwardly or forwardly and, therefore, the lower half of the window opening for each panel is provided upon its inner side with suitable insulation stripping 26' which covers a portion of the lower half of the adjacent panel, whereas the upper half of each panel has its edge in abutting relation with similar stripping (not shown) which is placed upon the outer side of the vehicle body and around the upper half of the window opening in which the panels are mounted.

In the second form of the invention, the windshield wiper mechanism may be mounted, as indicated at 27, upon the top of each panel frame 23 and the electric current conducting wires may be run through the vehicle body and through a portion of the panel frames in a manner indicated by dotted lines, the wire passing from the fixed to the stationary parts through the centers of the outer hinges, as indicated at 28.

From the foregoing it will be readily apparent that with a vehicle windshield constructed in accordance with the present invention, the operator or an occupant of the vehicle may open the windshield in such a manner as to facilitate wiping off the outside surface thereof to remove snow or ice or to enable the driver to operate the machine without the necessity of extending his head through the side window thereof as is necessary in operating the usual types of motor vehicles in snowy or sleety weather when such vehicles are equipped with fixed windshields. It is well known that although all vehicle windshields are equipped with wipers to remove rain or light snow, such wipers frequently fail to operate when wet snow is falling on the windshield or when the temperature is below freezing, so that the snow or rain freezes upon the windshield. It is then necessary for the operator to frequently stop and clean the windshield or it is necessary to provide some interior heating means for the same which will keep the ice and snow from freezing thereon. With the present windshield construction, the operator of the vehicle can keep the windshield partly open so as to be able to see the road ahead and, at the same time, may easily open the windshield to a sufficient extent to enable him to keep the snow and ice wiped off. Also, by forming the windshield in the two oscillatable portions it is possible to thoroughly ventilate the interior of the vehicle and to prevent a formation of moisture or mist on the inner surface of the transparent panel.

In connection with the showing of the form of the invention illustrated in Figure 4, no mechanism has been shown for oscillating the panels but it will be readily understood that there may be built into the instrument panel structure a suitable mechanical mechanism connected with the hinges of the panels to facilitate opening and closing of the panels through the manipulation of a crank or other operating medium. Such devices form standard fixtures in motor vehicles for the operation of cowl ventilators and since the method of operating the window of the windshield structure illustrated in this figure forms no part of the invention, no illustration of such mechanism has been made.

I claim—

A windshield structure, comprising a frame enclosing a transparent panel, a pair of hinge units disposed at opposite sides of said frame to facilitate swinging the same with respect to an encircling structure, one of said hinge units having an elongated pintle, a bar secured at one end to said pintle, a post mounted adjacent said frame, a pin threadably secured vertically in said post, a longitudinally slotted bar having said pin slidably extended through the slot thereof, said bar having pivotal connection at one end with the other end of the first-mentioned bar and a handle carried by said first-mentioned bar between its point of connection with the pintle and its point of connection with the slotted bar, said first-mentioned bar extending parallel with said frame and adapted when swung to turn the pintle and frame on said hinge units, said slotted bar extending away from a side of the panel and being adapted to be secured in an adjusted position with respect to said post.

FARIS NICKOLA.